Jan. 9, 1934.  O. WITTEL  1,942,891
MOTION PICTURE FILM MAGAZINE
Filed June 9, 1932   2 Sheets-Sheet 1
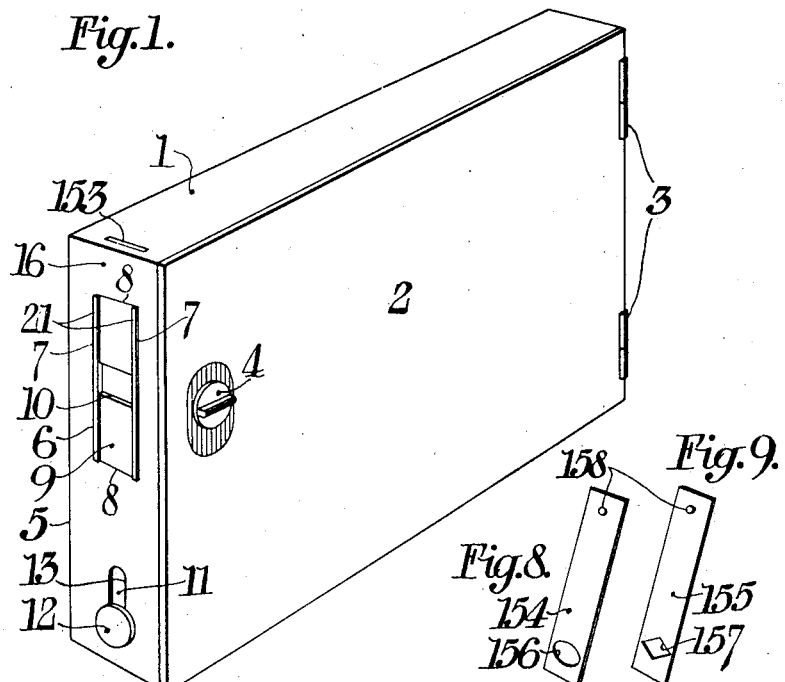
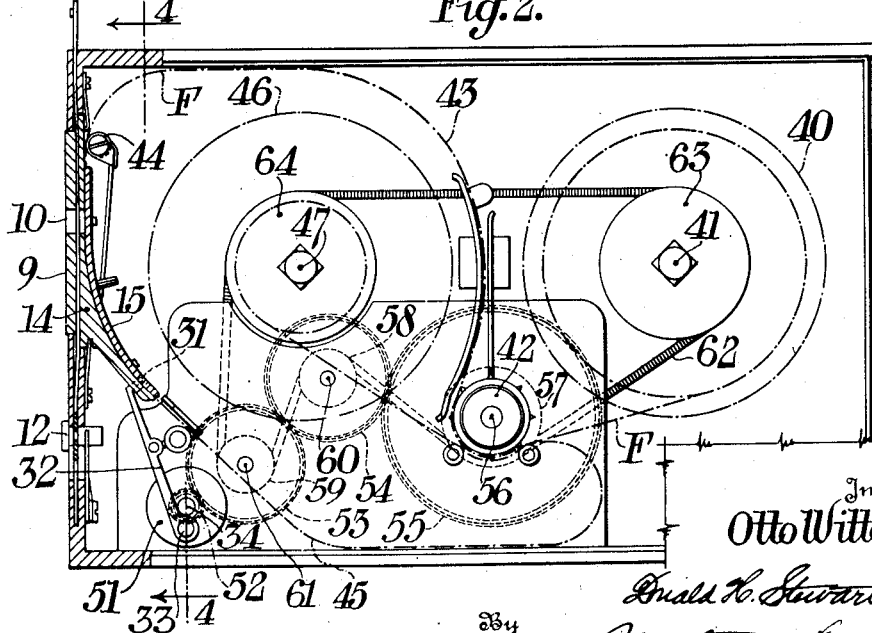

Jan. 9, 1934.     O. WITTEL     1,942,891
MOTION PICTURE FILM MAGAZINE
Filed June 9, 1932      2 Sheets-Sheet 2
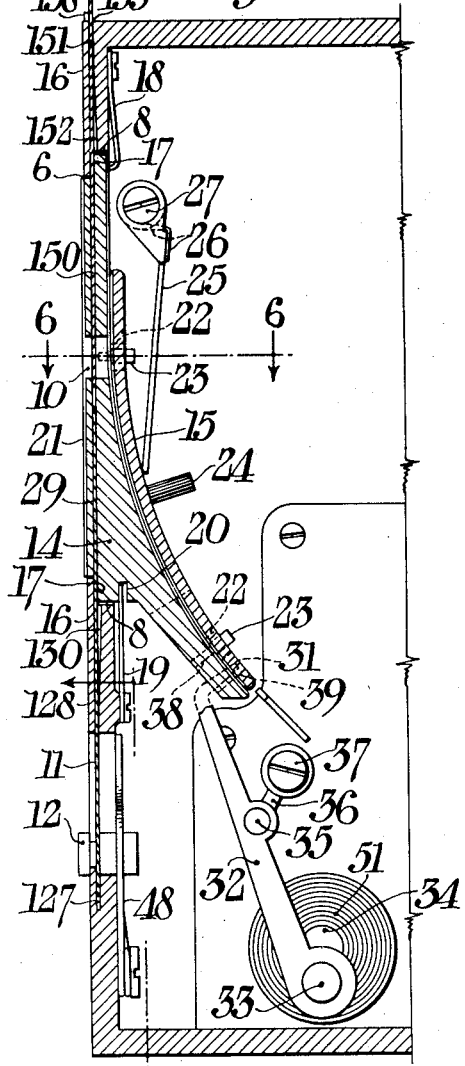
Fig.3.
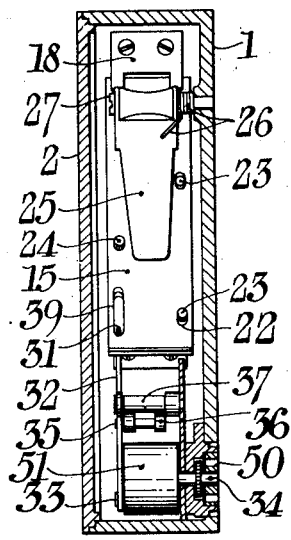
Fig.4.
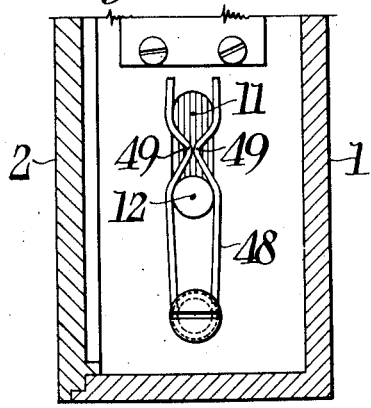
Fig.5.
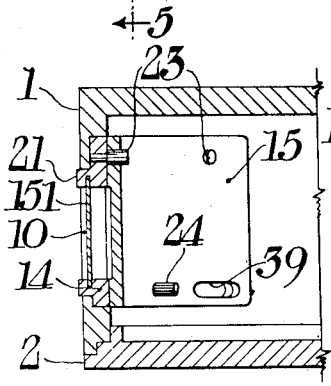
Fig.6.
Fig.7.
Inventor:
Otto Wittel,
By
Attorneys Patented Jan. 9, 1934

1,942,891

UNITED STATES PATENT OFFICE 1,942,891

MOTION PICTURE FILM MAGAZINE

Otto Wittel, Rochester, N. Y., assignor to Eastman Kodak Company, Rochester, N. Y., a corporation of New York Application June 9, 1932. Serial No. 616,225

27 Claims. (Cl. 88—17)

This invention relates to photography and more particularly to magazines for motion picture cameras. One object of my invention is to provide a film magazine in which there is a gate member adapted to be located accurately in the focal plane of an objective by means of a camera part. Another object of my invention is to provide a magazine with a floating gate mounted in a wall of a magazine and having a light-tight connection therewith. Another object of my invention is to provide a magazine with a slide adapted to control the admission of light to the gate member which is movably mounted on the magazine. Still another object of my invention is to provide a magazine having a gate member consisting of two parts, one part for locating the film and the other part for pressing the film on the locating member, both parts being resiliently mounted on the magazine. Another object of my invention is to provide a gate with a mask for specialized pictures as pictures of unusual shape, trick pictures and the like. Another object is to provide a floating gate with a mask guide which may cooperate with a fixed mask guide in the magazine. Still another object of my invention is to provide a movable gate member in a magazine which is equipped with a toothed pulldown member, the gate member being suitably equipped to receive the pulldown member in any position to which the gate member may move relative to the pulldown member and other objects will appear from the following specification, the novel features being pointed out in the claims at the end thereof.

Fig. 1 is a perspective view of a film magazine constructed in accordance with and embodying a preferred form of my invention removed from a camera.

Fig. 2 is a view of the magazine shown in Fig. 1 but with the cover opened as for loading.

Fig. 3 is an enlarged fragmentary section showing the gate structure.

Fig. 4 is a sectional view of the magazine on line 4—4 of Fig. 2.

Fig. 5 is a fragmentary detail partially in section and partially in elevation showing the snap-latch controlling the dark slide.

Fig. 6 is a section on line 6—6 of Fig. 3.

Fig. 7 is a fragmentary view showing my magazine mounted on a camera, and

Figs. 8 and 9 are perspective views of masking plates which may be used with my magazine.

There has been considerable difficulty in providing a magazine which can be attached and detached to a camera or projector in which the film in the magazine is held accurately in the focal plane of an objective located on a camera or projector. It is a relatively simple matter to make a suitable magazine by hand but when such magazines are made in production the few thousandths of an inch difference in the various magazine and camera parts are sufficient to throw out the focal plane of the film, particularly since it has been customary for the film to be located in the magazine and the objective to be located on a camera. The one type of magazine which overcame these difficulties was the type in which a loop of film is drawn out from the magazine and could be held in place by a gate carried solely by the camera. This type of magazine, however, has the disadvantage that threading is required to properly position the film in the gate, and a length of film is fogged each time the magazine is removed from the camera.

In a magazine constructed in accordance with my present invention, I provide a gate in the magazine itself, which positions the film relative to the magazine, but when the magazine is placed on a camera this gate is permitted to seat itself upon a locating member on the camera and thus be accurately positioned by the camera without the necessity of the film being threaded into a gate carried by the camera.

In Fig. 1, I show a preferred embodiment of my invention in which the magazine may consist of a rectangular housing 1 having a door 2 adapted to be opened by swinging the door upon the hinges 3. There is a latch 4 by which the door can be released. In the front wall 5 of the magazine there is an elongated window or opening 6, having relatively long sides 7, and comparatively short ends 8. This opening is completely closed by means of a gate member 9, having an opening 10 through which an exposure may be made, this opening being adapted to be closed by means of a dark slide 11, which may be operated by the knob 12 operating through a second slot 13 in the front wall 5 of the magazine.

The gate designated broadly as 9, as best shown in Fig. 3, may comprise a front section 14 which is a film locating section, and a rear section 15, which is a film presser section adapted to hold film against the front gate section.

Gate section 14 is provided with a light-tight connection with the edges 7 and 8 of the window 6. There may be a plate 16 carried by the front of the magazine, and, as shown in Fig. 3, the front gate section 14 is provided with a rabbet 17 fitting behind the plate 16 at the upper edge 8.

A spring 18 normally thrusts the gate member forwardly into contact with this plate.

At the opposite end of the gate, a spring 19 entering a slot 20 in the gate member thrusts it forwardly against the limiting plate 16 on the outside of the magazine. The gate member 14 is provided with a pair of accurately formed rails 21, these rails bearing a fixed relation to the film F lying opposite the exposure opening 10 in the gate. The presser gate section 15 is provided with a pair of apertures 22 adapted to engage pins 23 carried by the fixed gate section and the presser member 15 may be equipped with a handle 24 to facilitate removing this member for cleaning.

In order to hold the presser member 15 up against the locating gate section 14, an arm 25 is provided, this arm being spring-pressed toward the gate section by means of a spring 26 encircling the post 27 which supports the arm.

Thus the locating gate section 14 is resiliently mounted and is provided with rails 21 extending outside of the window 6 and presser gate section 15 is resiliently mounted on the fixed gate section 14, both gate sections being supported by springs carried by the magazine itself.

The extent to which the locating gate section 14 can move need not be great as in practice I have found that it is satisfactory to have this gate section moved quite a short distance as, for instance, .008 of an inch. In locating the floating gate it is not necessary to move the gate member over half of this distance, as it is only necessary for the rails 21 to position the gate by seating themselves upon the accurately formed camera locating plate 121.

This camera locating plate 121 bears a predetermined relation to the objective 122 or, more accurately, to the focal plate of the objective so that when the rails 21 through contact with plate 121 move the gate against the action of springs 18 and 19, a film F lying behind the exposure aperture 10 lies accurately in the focal plane of the objective 27, as indicated in Fig. 7.

In addition to the action of springs 18 and 19 for moving the gate member forwardly, there is the action of the dark slide 11 which is of necessity made of spring metal since this dark slide is carried in a guideway 127 cut in the fixed magazine wall 128 at one end and since this dark slide moves in a slideway 29 cut in the movable gate section 14 at the other end. In order to permit the relative movement between these parts the guideway 29 is made wider at the part 130 which lies adjacent to the gate thus permitting the dark slide to flex as the gate is moved.

A second guideway 150 is cut in gate member 14 and a guideway 151 enlarged or widened at 152 is cut in the fixed wall 16. Guideway 151 terminates on top of the magazine in a slot 153 forming an opening into which one of the diaphragms 154 or 155 (Figs. 8 and 9) may be introduced.

These diaphragms are preferably in the form of spring metal plates and are provided with fancy shaped openings 156 or 157 such as are commonly used for special effects and trick photography. The diaphragms may, of course, be provided with any desired shape or size opening for the work at hand.

Like dark slide 11, diaphragms 154 and 155 are preferably made of spring metal permitting them to flex as the gate 9 moves relative to the magazine wall 16.

As shown in Fig. 3 when a diaphragm 154 or 155 is moved into the magazine to its lowermost position determined by pin 158 striking the top of the magazine, an opening 156 or 157 is in place at the window 10. However, if the dark slide 11 is raised to cover the opening 10 a mask cannot then be moved to an operative position because both the dark slide and the masks utilize portions of the same slot 29. Thus this forms a safety precaution to prevent the slide from obscuring an opening in the mask.

The gate as a whole, as above explained, can move or float upon the front wall of the magazine. I provide a toothed pulldown member 31 for moving film through the gate. This pulldown member may be carried by an arm 32 pivoted at 33 to an eccentric 51 carried by the shaft 34 and pivoted at 35 to a link 36 adapted to turn on the fixed stud 37. The pulldown claw 31 extends into a slot 38 cut into the gate section 14 and the gate section 15 may be either grooved or slotted at 39 to permit the claw to pass through the film. The size and shape of the slots 38 and 39 are such that irrespective of the position of the gate member the claw may still satisfactorily engage and move a film lying therein. Thus the gate section may float so that the relation of the toothed film engaging member 31 may alter with respect to film passing through the curved portion of the gate but nevertheless the toothed member will engage a film aperture more or less deeply and will move the film in any position of the gate.

While any arrangement of film supply and take-up may be used with my invention, in the preferred embodiment shown in the drawings I provide a supply reel 40 mounted on a shaft 41 from which a film F is led over a sprocket 42 into a loop 43 and thence over the guide roller 44 through the gate sections 14 and 15, past the toothed pulldown mechanism 31 into a loop 45 from which the film passes over sprocket 42 onto a take-up reel 46 carried by the shaft 47.

Since the particular winding arrangement and path of the film is the subject matter of a copending application, Serial No. 620,176 filed June 30, 1932, the structure by which these parts are moved need not be further described in the present application.

The dark slide 11 may be manually moved from the button 12 on the outside of the front wall 5 of the camera. In order to hold this slide in either an operative or inoperative position (see Fig. 5) in the former of which it closes the aperture 10, I provide a spring 48 having pairs of shoulders 49 which definitely latch the button 12 in either of its two positions.

The drive for the magazine movable parts may conveniently be as follows: A clutch 50 (Fig. 4) derives power from a camera power driven shaft (not shown) to positively drive shaft 34. Shaft 34 carries eccentric 51 which operates the pulldown claw 31, and also a pinion 52.

Pinion 52 through gears 53, 54, 55 and shaft 56 drives sprocket 42. There is also a pulley 57 on shaft 42. Similar pulleys 58 and 59 turn on shafts 60 and 61 around which a belt 62 passes, this belt deriving power from pulley 57. The belt 62 turns, through pulleys 63 and 64, shafts 41 and 47 so these shafts, as well as the pulldown 31 and sprocket 42 may be driven in either direction.

With a magazine constructed in accordance with the above-described embodiment of my invention, the door 2 may be swung open and the film F may be threaded through the machine as above described, after which the door 2 may be held in a closed position by means of the latch 4. The magazine is now ready for use, the dark slide 11 covering the opening 10. By placing the magazine on the camera, the rails 21 of the film locating gate section 14 move the gate a slight distance—say, .002 of an inch. Since the camera locating member 26 has been very accurately formed and since the rails 21 on the gate section 14 have been very accurately formed, the gate will be accurately located in the focal plane of the objective 122. This does not require any extra movements on the part of the operator and since there is a light-tight connection between the edges of the gate section 14 and the window 6 there is no danger of light entering the magazine and fogging the film.

It will be noted that the normal locating action of the camera locating member 121 and the rails 21 will be to merely move the gate section rearwardly a slight distance, although, of course, it is possible that the top of the gate may be moved rearwardly a somewhat greater distance than the bottom or vice versa. The edges 7 and 8 of the opening, however, closely fit portions of the gate member 14 so that this gate is prevented from moving either sidewise or up and down with respect to the opening. In other words, there may be an axial movement of the gate relative to the objective 22 or this axial movement may be modified to such an extent that the gate may rock rearwardly more at the top than at the bottom, or vice versa. However, the position of the gate transversely and longitudinally of the front wall of the magazine cannot be altered by placing the magazine on a camera.

To operate the magazine, it is only necessary to move the button 12 to its inoperative position where it is held by the spring shoulder 49. In this position the film may be exposed in the camera to the extent desired and if a second magazine carrying a different kind of film is to be used a dark slide 11 may be moved over the opening 10 by the knob 12 and one magazine may be substituted for another. Thus there is no possibility of fogging even as much as a single frame of film in changing magazines.

The method of locating the assembled gate totally carried by the magazine against a locating member on the camera automatically takes care of any manufacturing variations which will normally occur in the construction of the magazine proper since it is very difficult to hold the outside walls of the magazine within a tolerance close enough to accurately position a film where a front gate is not employed.

With a magazine constructed in accordance with my invention it is only necessary to form the rails 21 and the film channel 50 with extreme accuracy to properly hold the film in the focal plane of a camera where the locating member 26 of the camera has also been accurately formed.

While it is obvious that my invention may be employed for magazines adapted to be used with cameras or projectors such a magazine is particularly suitable for cameras, and, of course, the size and shape of the magazine may be altered to suit the particular camera with which the magazine is to be used.

I contemplate as within the scope of my invention all such modifications as may come within the terms of the appended claims.

I claim:

1. In a magazine for motion picture apparatus, the combination with a closed film container, of a film gate including two relatively movable members between which a film may pass, and a resilient gate mount upon which the entire gate may move relative to the container.

2. In a magazine for motion picture apparatus, the combination with a closed film container, of a film gate including two relatively movable members between which a film may pass, a resilient gate mount upon which the entire gate may move relative to the container, and a light tight connection between the gate mount and the container.

3. In a magazine for motion picture apparatus, the combination with a closed film container, of a film gate including two relatively movable members between which a film may pass, a resilient gate mount upon which the entire gate may move relative to the container, said gate and gate mount being located in a wall of said magazine.

4. In a magazine for motion picture apparatus, the combination with a closed film container having a plurality of walls one of which is apertured, a gate including locating and presser members mounted to move relative to each other, and a resilient support for the gate located in the apertured wall.

5. In a magazine for motion picture apparatus, the combination with a closed film container having a plurality of walls one of which is apertured, a gate including locating and presser members mounted to move relative to each other, and a resilient support for the gate located in the apertured wall and having a light-tight connection therewith.

6. In a magazine for motion picture apparatus, the combination with a closed film container having an opening in one side, of a film gate assembly resiliently mounted in said opening and adapted to be located by a locating member outside of said container.

7. In a magazine for motion picture apparatus, the combination with a closed film container having an opening in one side of a film gate assembly resiliently mounted in said opening and having parts thereof projecting through said opening.

8. In a magazine for motion picture apparatus, the combination with a closed film container having an opening in one side, of a film gate assembly resiliently mounted in said opening and having parts extending through said opening, said parts having a light tight connection with said opening.

9. In a magazine for motion picture apparatus, the combination with a closed film container having an opening in one wall, a film gate assembly resiliently mounted in said opening, said gate assembly comprising a film locating member and a film presser member, said film locating member projecting outside of the opening in the container wall.

10. In a magazine for motion picture apparatus, the combination with a closed film container having an opening in one wall, a film gate assembly resiliently mounted in said opening, said resilient mount including pairs of leaf springs pressing said gate through said wall opening, and a stop for limiting the movement of said gate under the action of said springs.

11. In a magazine for motion picture apparatus, the combination with a closed film container having an opening in one wall, a film gate assembly resiliently mounted with respect to said magazine, means contained in the mounting for limiting the movement of the gate relative to the magazine, a pulldown carried by the magazine and adapted to move through a fixed path, said gate having an opening of such size that said pulldown may engage a film through said opening in all positions to which said gate may move on its resilient mount.

12. In a magazine for motion picture film, the combination with a closed film container having an opening in one wall, of a film gate mounted in said opening, said mounting including resilient members and guides, said resilient members being adapted to normally thrust the gate in one direction and said guides being adapted to prevent motion of the gate in a transverse direction.

13. In a magazine for motion picture apparatus, the combination with a closed film container having a slot in one wall, of a film gate assembly mounted resiliently in said slot, said slot including cooperating walls on the magazine and gate for defining the position of said gate longitudinally and transversely of the magazine, said resilient mounting exerting a thrust on said gate tending to thrust said gate through said slot.

14. In a magazine for motion picture apparatus, the combination with a closed film container, of a gate assembly comprising a film locating member and a film presser member, a resilient mount supporting the film locating member on the container, a resilient mount carried by the film supporting member whereby the film presser member is carried by the film supporting member.

15. In a magazine for motion picture apparatus, the combination with a closed film container, of a gate assembly comprising a film locating member and a film presser member, a resilient mount supporting the film locating member in an aperture in the wall of the closed container, said film locating member having a face plate adapted to close the aperture in the container, and a curved wall extending into the container, there being a slot in the curved wall adapted to receive a toothed pulldown member.

16. In motion picture apparatus the combination with a camera having an accurately formed member, of a magazine adapted to be placed on the camera, a film gate resiliently mounted on the magazine and adapted to be located by said accurately formed member of said camera.

17. In motion picture apparatus the combination with a camera having an objective, and an accurately formed locating device bearing a predetermined relation to the focal plane of said objective, a magazine adapted to fit onto said camera, said magazine including a floating gate, and means included in the gate adapted to engage and to be located by the camera device bearing a predetermined relation to the focal plane of the objective.

18. In a motion picture apparatus the combination with a camera having an objective and a locating member positioned in a predetermined relation thereto, of a magazine, a gate movably mounted on said magazine, means on said magazine for controlling the position of said gate in two directions, said camera locating member being adapted to locate said gate axially of said objective.

19. In a motion picture apparatus the combination with a camera having an objective and a locating member positioned in a predetermined relation thereto, of a magazine, a gate movably mounted on said magazine, means for resiliently moving said gate toward said camera objective, said camera locating member being adapted to limit the movement of said gate member to a position in which said gate may lie in the focal plane of said objective.

20. In a magazine for motion picture apparatus, the combination with a closed film container, of a floating film gate resiliently mounted in a wall of said container, said gate comprising a film locating member and a film pressing member, one of said members being slotted and having a window therein, a slide mounted in the slotted member and adapted to slide in the slot to and from the window, and a mount for a portion of said slide on said container.

21. In a magazine for motion picture apparatus, the combination with a closed film container, of a floating film gate resiliently mounted in a wall of said container, said gate comprising a film locating member and a film pressing member, one of said members being slotted and having a window therein, a slide mounted in the slotted member and adapted to slide in the slot to and from the window, a mount for a portion of said slide on said container, and a handle carried by said container for moving the slide.

22. In a magazine for motion picture apparatus, the combination with a closed film container, of a floating film gate resiliently mounted in a wall of said container, said gate comprising a film locating member and a film pressing member, one of said members being slotted and having a window therein, a slide mounted in the slotted member and adapted to slide in the slot to and from the window, a mount for a portion of said slide on said container and a handle carried by said container for moving the slide, said handle including a spring tending to hold said slide in a fixed position.

23. In a magazine for motion picture apparatus the combination with a closed film container, of a floating film gate resiliently mounted in a wall of said container, said gate including a window and a slot leading past said window, a resilient slide adapted to pass through said slot, said slide being supported in part by said gate and in part by said container.

24. In a magazine for motion picture apparatus the combination with a closed film container, of a floating film gate resiliently mounted in a wall of said container having an exposure window therein and having a slot extending past the window in two directions, a movably mounted dark slide in one end of the slot adapted to move to cover and uncover the window and a masking slide also adapted to move in the same slot to and from an operative position relative to the window said masking slide being held from an operative position when said dark slide covers the window.

25. In a magazine for motion picture apparatus the combination with a closed film container, of a floating film gate resiliently mounted in a wall of said container having an exposure window therein and having a slot extending past the window in two directions, a movably mounted dark slide in one end of the slot adapted to move to cover and uncover the window and a masking slide also adapted to move in the same slot to and from an operative position relative to the window, said container being slotted to each side of the slotted gate, said dark slide and said masking slide both being made of flexible material whereby said floating gate may move relative to said container.

26. In a magazine for motion picture apparatus the combination with a closed film container, of a floating film gate resiliently mounted in a wall of said container having an exposure window therein, and having a slot extending past the window in two directions, said container also being slotted adjacent the slot in the gate, and a flexible masking slide adapted to move through the slot in the container and gate.

27. In a magazine for motion picture apparatus the combination with a closed film container, of a floating film gate resiliently mounted in a wall of said container having an exposure window therein and having a slot extending past the window in two directions, said container also being slotted adjacent the slot in the gate, said slot being widened out at the end adjacent the gate, a flexible masking slide adapted to be carried by the two slots, the flexibility of said slide and the widened slot allowing said gate to float with respect to said container.

OTTO WITTEL.